United States Patent [19]

Arner

[11] Patent Number: 6,036,597
[45] Date of Patent: Mar. 14, 2000

[54] COMBINE HARVESTER ROTOR LOAD CONTROL

[75] Inventor: Robert J. Arner, Lee's Summit, Mo.

[73] Assignee: Agco Corporation, Independence, Mo.

[21] Appl. No.: 09/022,112

[22] Filed: Feb. 11, 1998

[51] Int. Cl.$^7$ .................................................. A01D 75/18
[52] U.S. Cl. ........................ 460/6; 460/150; 56/10.2 G; 56/DIG. 15
[58] Field of Search .................................. 460/116, 1, 6, 460/119, 150; 56/10.2 G, 10.2 H, 11.9, 14.6, DIG. 15

[56] References Cited

U.S. PATENT DOCUMENTS

| | | |
|---|---|---|
| 3,093,946 | 6/1963 | Pitt et al. . |
| 4,487,002 | 12/1984 | Kruse et al. .................................. 460/6 |
| 4,893,241 | 1/1990 | Girodat et al. .................... 56/10.2 G X |

FOREIGN PATENT DOCUMENTS

| | | |
|---|---|---|
| 1407720 | 5/1969 | Denmark . |
| 2 030 767 | 6/1970 | Denmark . |
| 2 200 133 | 7/1973 | Denmark . |
| 6510635 | 2/1966 | Netherlands . |

OTHER PUBLICATIONS

International Publication No. WO 87/04894 –Published Aug. 27, 1987.

*Primary Examiner*—Thomas B. Will
*Assistant Examiner*—Arpad Fabian Kovacs
*Attorney, Agent, or Firm*—Reising, Ethington, Barnes Kisselle, et al

[57] ABSTRACT

The threshing cylinder or rotor of a combine harvester is driven by a rotor hydraulic motor. A rotor pump, driven by an internal combustion engine supplies hydraulic fluid to the rotor hydraulic motor to drive the rotor. A variable speed traction drive propels the harvester over the surface of a field to harvest crops. A control system varies the ground speed of the harvester based upon the pressure of hydraulic fluid supplied to the rotor hydraulic motor to maintain a substantially constant crop material feed rate through the threshing cylinder or rotor. The control system can be an electronic system that measures the pressure of hydraulic fluid on the inlet side of the rotor hydraulic motor and varies the ground speed to keep the measured hydraulic fluid pressure substantially constant. A control system can also include a pressure control valve that varies the ground speed to maintain a constant rotor motor inlet hydraulic pressure.

22 Claims, 4 Drawing Sheets

COMBINE HARVESTER ROTOR LOAD CONTROL

TECHNICAL FIELD

This invention relates to combine harvesters and more particularly to a control system that controls ground speed to maintain a constant load on the threshing rotor.

BACKGROUND OF THE INVENTION

The grain threshing, separating and cleaning assemblies of a combine harvester operate at maximum efficiency only if there is a substantially constant crop material feed rate. A change in the feed rate of grain, or the feed rate of crop material other than grain affects the operation of the threshing, separating and cleaning assemblies. The standard adjustments found on harvesting machines make it possible to accommodate and harvest a variety of crops under a variety of crop and weather conditions. However, it takes time and skill to make these adjustments. A change in the quantity of material passing through a combine harvester can substantially change the efficiency of the harvesting operation even if the weather and crop conditions remain unchanged.

A decrease in the quantity of crop material passing through the threshing cylinder or rotor and concave can result in a substantial increase in the quantity of cracked grain. Cracked grain is blown out of the harvester and on to the ground by the cleaning system fan.

An increase in the quantity of crop material passing through a harvester can overload the cleaning system, form a mat of crop material on the sieve of the chaffer and a large portion of the threshed grain will end up on the ground rather than in the grain tank. An increase in the quantity of crop material passing through a harvester can also overload the separating assemblies and cause grain loss.

Combine harvesters are designed to handle close to the maximum capacity of the threshing assembly, separating assembly and cleaning assembly, and the power source at any given time. To do this, the capacity of each of the assemblies and the power source must be balanced with each other. Due to variations in crop conditions and weather conditions, it is not possible to attain a perfect balance between the threshing, separating and cleaning assemblies and the power source. In practice operators generally adjust the threshing, separating and cleaning assemblies for a crop material feed rate which leaves sufficient power available to propel the combine with the current field conditions and to unload the grain tank. The operator then varies the grounds speed of the harvester as best he can to maintain a constant crop material feed rate. Experienced combine operators can maintain crop material feed rates within a range that attains satisfactory threshing, separating and cleaning. However, due to operator fatigue, even experienced operators fail to maintain crop material feed rates within an acceptable range after several hours of operation without a rest period.

Systems that maintain a constant load on a harvester internal combustion engine by controlling harvester ground speed have been tried. Some of these systems sense engine load through the engine governor and adjust harvester ground speed to maintain engine load within a narrow range. When a field to be harvested is dry and flat, the engine load control can maintain a fairly constant crop material feed rate. Hills or slopes in a field can vary the power required to propel a combine harvester through the field to such an extent that an engine load based control system is rendered unacceptable for controlling crop material feed rate.

A field with hard, compact soil in some areas and soft soils in other areas will have variable power requirements for propelling a combine harvester through the field. This variation in the total engine load can result in an engine load based control system making large changes in ground speed and unacceptable changes in crop material feed rates.

Attempts have been made to measure the load on combine harvester threshing cylinders and employ the measured load to control crop material feed rates. Measurement of the load on the threshing cylinder has been difficult. A system based on the creep of a cylinder drive belt in the driven and driving pulleys or sheaves worked well. However, if the cylinder drive belt becomes over loaded and actually slips, the system fails to control crop material feed rate. For a belt drive based system to measure threshing cylinder load to control crop material feed rate, the belt drive must be capable of transmitting more torque than will be required, to avoid belt slip. Such belt drives are expensive and are generally not available on high-capacity combine threshing cylinder drives.

SUMMARY OF THE INVENTION

An object of the invention is to control crop material feed rate in a combine harvester by controlling harvester ground speed. Another object of the invention is to control combine harvester ground speed based on threshing and separating rotor drive power requirements. A further object of the invention is to control combine harvester ground speed by sensing the pressure of hydraulic fluid entering a hydraulic motor driving the threshing cylinder and sending signals to the traction drive to adjust ground speed and thereby maintaining the crop material feed rate within a selected range.

The combine harvester has an axial flow threshing and separating rotor. A rotor hydraulic pump is driven by an internal combustion engine that powers the harvester. A rotor hydraulic motor is driven by hydraulic fluid from the rotor pump and drives the threshing and separating rotor. A traction drive hydraulic pump is also driven by the internal combustion engine. A traction drive hydraulic motor is driven by a hydraulic fluid from the traction drive pump and drives the driven ground engaging wheels through a gear transmission.

An Electronic controller monitors the pressure of hydraulic fluid entering the hydraulic motor. This pressure is proportional to the power required to drive the rotor. The controller has an adjustable rotor pressure selector that is manually set. The controller compares the set pressure of the pressure selector with the sensed pressure of hydraulic fluid entering the rotor hydraulic motor. If the two pressures differ more than a predetermined amount, the controller sends a signal to the traction drive pump to adjust the swash plate position and thereby change the harvester ground speed. If the measured pressure of hydraulic fluid entering the rotor hydraulic motor is less than the selected set pressure, more than a predetermined amount, the controller will send a signal to the solenoid control valve on the traction drive hydraulic pump to move the swash plate to a position that will increase the stroke of the pump pistons, increase hydraulic fluid flow and increase harvester ground speed. The increased ground speed will increase the crop material feed rate which will increase the power required to rotate the rotor and increase the pressure of hydraulic fluid entering the hydraulic motor. The controller will send a signal to the solenoid control valve on the traction drive hydraulic pump to move the swash plate to a position which will decrease the stroke of the pump pistons when the measured pressure of hydraulic fluid entering the rotor hydraulic motor is more than the selected set pressure by more than a predetermined amount. The decrease in the stroke of the pump pistons decreases hydraulic fluid flow and decreases harvester ground speed. The decreased ground speed will decrease the crop material feed rate which will decrease the power required to rotate the rotor and decrease the pressure of hydraulic fluid entering the rotor hydraulic motor.

The maximum ground speed of the combine harvester is set manually by the operator. The controller can decrease the harvester ground speed from the manually set ground speed. The controller can also increase the ground speed up to the maximum speed set manually by the operator.

The controller described above is an electronic controller. A hydro mechanical controller can also be employed. The hydro mechanical controller control system includes a pressure override control valve that controls the pressure of hydraulic fluid supplied to the traction drive pump control valve. The traction drive pump control valve supplies hydraulic pressure to servo pistons that control the position of the traction pump swash plate. The pressure override control valve is a spool valve with an end biased by a spring and the other end biased by hydraulic fluid under pressure from the rotor motor hydraulic fluid inlet. The spring is manually loaded to set the pressure of hydraulic fluid supplied to the rotor drive motor. When the pressure of hydraulic fluid at the rotor motor hydraulic fluid inlet changes, the spool valve changes the position of the traction pump swash plate and thereby returns the crop material feed rate to the selected feed rate.

BRIEF DESCRIPTION OF THE DRAWINGS

The foregoing and other objects, features and advantages of the present invention will become apparent in the light of the following detailed description of exemplary embodiments thereof, as illustrated in the accompanying drawing.

DESCRIPTION OF THE PREFERRED EMBODIMENT

Figure 1:
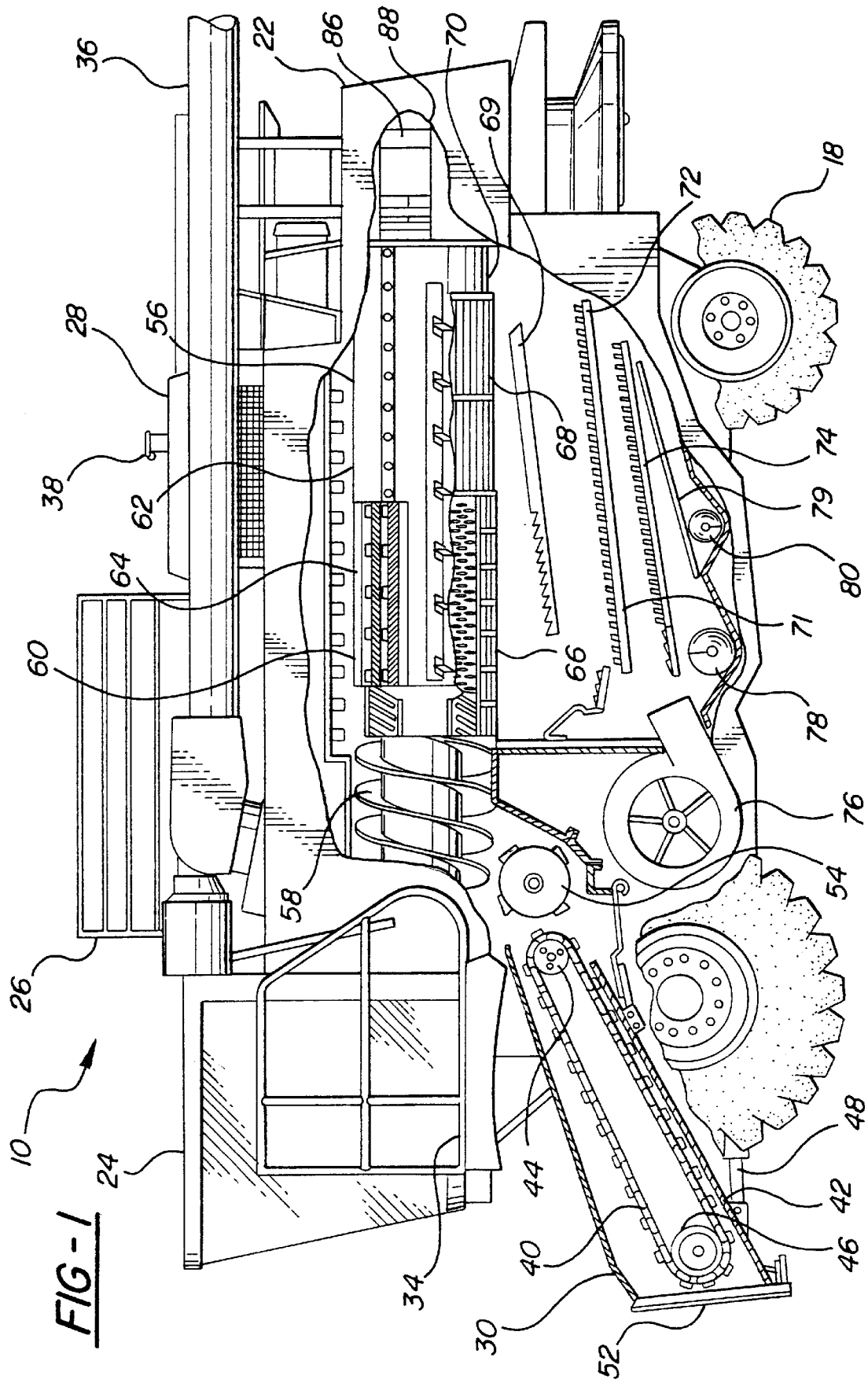
FIG. 1 is a side elevational view of combine harvester separator with parts broken away.

The combine harvester, generally designated by reference no. 10, is self-propelled. The combine frame 12 is supported by two front driven wheels 14 and 16 and rear steered wheels 18 and 20. The wheels 18 and 20 could be also driven if desired. The frame 12 could also be supported by a full track system or by half tracks. Half tracks would replace the driven wheels 14 and 16 only.

The combine 10 has a separator housing 22 mounted on the frame 12, an operator's work station and cab 24 mounted on the front portion of the frame, a grain tank 26, an engine compartment 28 and an elevator assembly 30. A ladder 32 and cab access platform 34 provide operator access and egress to and from the cab 24. A swingable unloading auger assembly 36 pivots to a position extending laterally outward to one side of the combine 10 to unload the grain tank 26. The unloading auger assembly 36 swings inward to a storage position shown in FIGS. 1 and 2 when the grain tank 26 is not being unloaded. The engine compartment 28 houses an internal combustion engine 38 mounted on the frame 12 above the separator housing 22 and to the rear of the grain tank 26.

Figure 2:
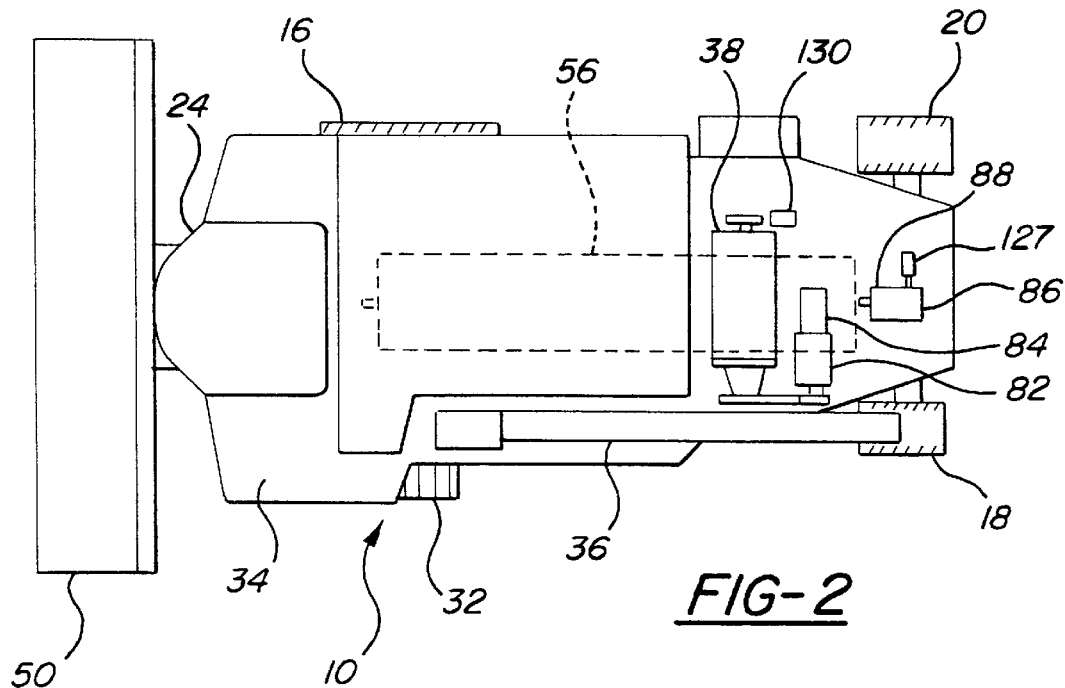
FIG. 2 is a schematic plan view of a combine harvester and harvester drive components.
Figure 3:
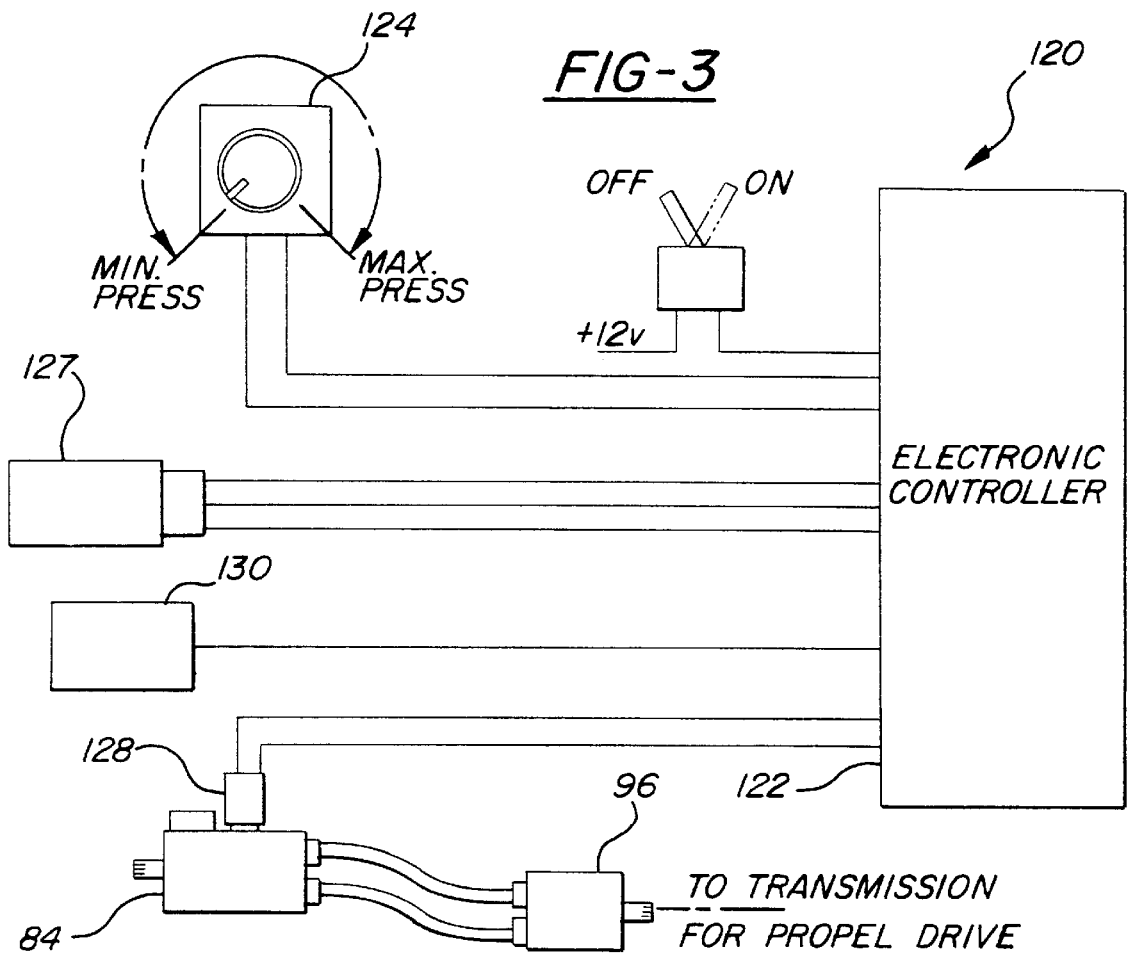
FIG. 3 is a schematic view of a combine harvester threshing rotor load control system.

The elevator assembly 30 has a conveyor 40 mounted in an elevator housing 42. The conveyor 40 as shown in FIG. 1 is trained around rear drive sprockets 44 and a front drum 46. Pivot assemblies (not shown) pivotally attach the elevator housing 42 to the frame 12 for pivotal movement about the axis of the drive sprockets 44. Hydraulic linear actuators 48 pivot the elevator housing 42 to raise and lower the forward end of the housing. Headers 50 attach to the forward end surface 52 of the elevator housing 42. These headers 50 can be grain headers which sever crop material from the ground, pick-up headers which lift crop material from the ground, corn heads and other various headers designed for specific crops. All of these headers 50 gather crop material and feed the crop material to the conveyor 40. The conveyor 40 conveys crop material into the separator housing 22.

Crop material is fed to the feed beater 54 by the conveyor 40 in the elevator housing 42. The beater 54 feeds crop material to an axial flow threshing and separating rotor 56. The rotor 56 as shown in FIG. 1 has a feed section 58, a threshing section 60, and a separation section 62. The feed section 58 moves crop material in a spiral path about the generally horizontal fore and aft axis of rotation to the rotor 56, toward the threshing cylinder section 60 and generally parallel to the axis of rotation of the rotor. In the threshing cylinder 60, crop material passes between the cylinder bar 64 and a concave 66 where the grain is threshed. Threshed grain, that is not separated by the concave 66, is separated in the separation section 62 and passes through the separation grate 68. The grain pan 69 conveys grain and chaff forward and deposit it on the chaffer 72. Crop material other than grain is discharged from the rotor 56 through the rotor discharge 70.

Grain and crop material other than the grain that passes through the concave 66 and the separation grate 68 falls to an upper grain pan 69. The grain pan 69 conveys grain and chaff forward and deposit it on the chaffer 72. The grain is cleaned by a chaffer 72 and a sieve 74 and air from a fan 76. Chaff is discharged from the rear of sieve 74 and chaffer 72. Clean grain falls into the clean grain auger 78 and is conveyed to the clean grain auger by a lower grain pan 73. The clean grain is conveyed to the grain tank 26 by the auger 78 and an elevator (not shown). Tailings fall into the returns auger 80 and are conveyed to the rotor 56 by the returns auger and a returns elevator (not shown). where they are threshed a second time.

The threshing and separating rotor 56 as described above, is referred to as an axial flow threshing rotor because crop material is moved in a direction generally parallel to the axis of rotation of the rotor. Combine threshing cylinders that receive crop material tangentially and discharge crop material tangentially are also used. In these harvesters, the cylinder generally rotates about an axis that is perpendicular to the path of movement of the material.

The internal combustion engine 38 mounted in the engine compartment 28 drives a rotor pump 82 and a traction drive pump 84. The rotor pump 82 drives a rotor hydraulic motor 86. The rotor hydraulic motor 86 drives the threshing and separating rotor 56 through a planetary reduction gear train in a gear box 88. A supply line 90 and return line 92 connect the rotor pump 82 and the rotor motor 86 to each other in a closed circuit. Leakage of hydraulic fluid in the pump 82 and the motor 86 is returned to the sump. Make up of hydraulic fluid is supplied to the return side of the rotor pump 82 from the sump S by a make-up fluid pump 94. The pump 94 maintains a pressure of 350 pounds per square inch on the return side of the rotor pump 82.

The traction drive pump 84 is connected to a traction drive motor 96 by a supply line 98 and a return line 100. The motor 96 drives a transmission 102. Gear trains and a differential in the transmission 102 drive a right side drive shaft 104 and a left side drive shaft 106. A speed reduction gear box 108 transmits torque from the drive shaft 104 to the driven wheel 16. The driven wheel 14 is driven by the drive shaft 106 through a speed reduction gear box 110.

The supply line 98 and the return line 100 connect the traction drive pump 84 and the traction drive motor 96 together in a closed loop hydraulic system. Leakage of hydraulic fluid in the pump 84 and the motor 96 is returned to a sump S. The make-up fluid pump 95 supplies made up hydraulic fluid to the return side of the traction drive pump 84 and maintains a pressure of 350 pounds per square inch on the return side of the pump 84.

The torque required to drive the rotor 56 of a combine harvester 10 is proportional to the pressure of hydraulic fluid entering the rotor motor 86. The torque required to drive the rotor 56 is also proportional to the quantity of crop material passing through the rotor. By maintaining a substantially constant fluid pressure at the entry of hydraulic fluid into the rotor motor 86, a substantially constant crop material flow rate through the threshing and separating rotor 56 is attained. The crop material flow rate into a harvester 10 is also proportional to the width of the header, the forward speed of the harvester and the density of crop material to be harvested by the harvester. The density of crop material varies across a field to be harvested due to differences in soil conditions, rainfall, fertilization, drainage, slope relative to the sun, and other factors. By changing the forward speed of the harvester 10 it is possible to accommodate variations in crop material density in a field and obtain a substantially uniform crop material feed rate through a crop threshing mechanism 56. A skilled operator can manually adjust forward speed and reduce the variations in crop material feed rate. However, manual control of harvester ground speed to control crop material feed rate is inaccurate, takes the attention of the harvester operator away from other critical duties, and leads to operator fatigue.

An electronic rotor load control generally designated 120 is provided to simultaneously reduce the work load of the harvester operator, reduce grain loss and increase the quantity of grain harvested per hour. The rotor load control 120 includes an electronic controller 122, a manually adjustable control potentiometer 124 for selecting the desired thresher rotor set point and an on and off switch 126. A pressure transducer 127, that measures the pressure of hydraulic fluid entering the rotor motor 86 is mounted on the rotor motor and connected to the electronic controller 122. A solenoid control valve 128 is mounted on the traction pump 84, to control the position of the traction pump swash plate 210, and is connected to the electronic controller 122. An engine speed sensor 130 is mounted on the harvester 10 in a position to sense the rotational speed of the engine 38 and is connected to the electronic controller 122.

During operation of the harvester 10, the operator moves the on and off switch 126 to an on position to engage the rotor load control 120. The electronic controller 122 receives sensed pressures from the pressure transducer 127 and compares the actual pressure sensed by the pressure transducer to the pressure set point provided by the adjustable control potentiometer 124. When the actual pressure of hydraulic fluid entering the rotor motor 86 varies more that a predetermined amount from the set point of the potentiometer 124, the electronic controller 122 sends a signal to a solenoid control valve 128 to move the swash plate 129 of the traction pump 84 and change the speed of the traction motor 96. If the actual pressure sensed by the transducer 127 is less than the set point of the potentiometer 124 by more than a predetermined amount, the electronic controller 122 will increase ground speed to increase crop material feed rate. If the actual pressure sensed by the pressure transducer 127 is more than the set point of the potentiometer 124 by more than a predetermined amount, the electronic controller 122 will decrease ground speed to decrease crop material feed rate. Preferably the ground speed of the harvester 10 is changed in incremental steps. There is a time lag between the time there is a change in ground speed and a change in the rotor load resulting from the ground speed change. Incremental steps reduce the tendency to make larger speed changes than necessary. Pressure comparisons are made several times per minute by the controller 122 to keep up with changes in crop material feed rate.

The rotor load control system 120 makes it possible in good crop and field conditions to operate the harvester at a crop material feed rate that uses almost all of the power available from the internal combustion engine 38 of the harvester 10. If the operator attempts to unload the grain tank 26 into a truck moving alongside the harvester 10, or if the surface of the field which the harvester is travelling upon becomes softer for example, there can be a dramatic increase in the power required. This increase in the power required will frequently overload the engine 38. When more power is required then the engine 38 can provide, the engine will start to slow down. The decrease in the engine speed, detected by the engine speed sensor 130, is transmitted to the electronic controller 122. Upon detection of an overloaded engine 38, the electronic controller 122 will override the rotor load control portion of the controller 120 and decrease forward speed of the harvester 10 to prevent the engine from stalling. As soon as the speed of the engine 38 returns to the normal operating range, the rotor load controller 122 will resume control of the speed of the harvester. If the engine overload condition continues, the operator will have to reduce the set point pressure with the adjustable control potentiometer 124 to a pressure which permits the electronic controller 122 to control the forward speed of the harvester 10 based on rotor motor inlet hydraulic fluid pressure measured by the pressure transducer 127.

The crop material feed rate control system described above is described in combination with a threshing and separating rotor 56 that moves crop material in a spiral path around the axis of the rotor. The system is for use on a harvester 10 that employs a hydraulic motor 86 to drive the rotor 56. Combine harvesters with threshing cylinders that rotate around an axis transverse to the direction of crop material movement through the cylinder and concave could also employ the crop material feed rate control if the cylinder is driven by a hydraulic motor 86.

The speed of rotation of a threshing cylinder driven by a hydraulic motor 86 tends to change with temperature. As the temperature of the hydraulic oil increases, the speed tends to decrease. A constant cylinder or rotor speed control system that maintains a substantially constant cylinder or rotor speed can be used in combination with the load control system described above.

Figure 4:
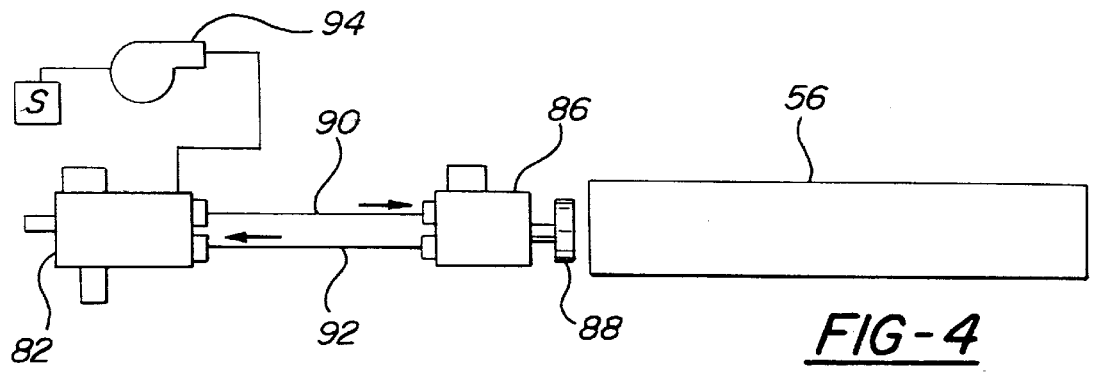
FIG. 4 is a schematic view of the rotor drive.
Figure 5:
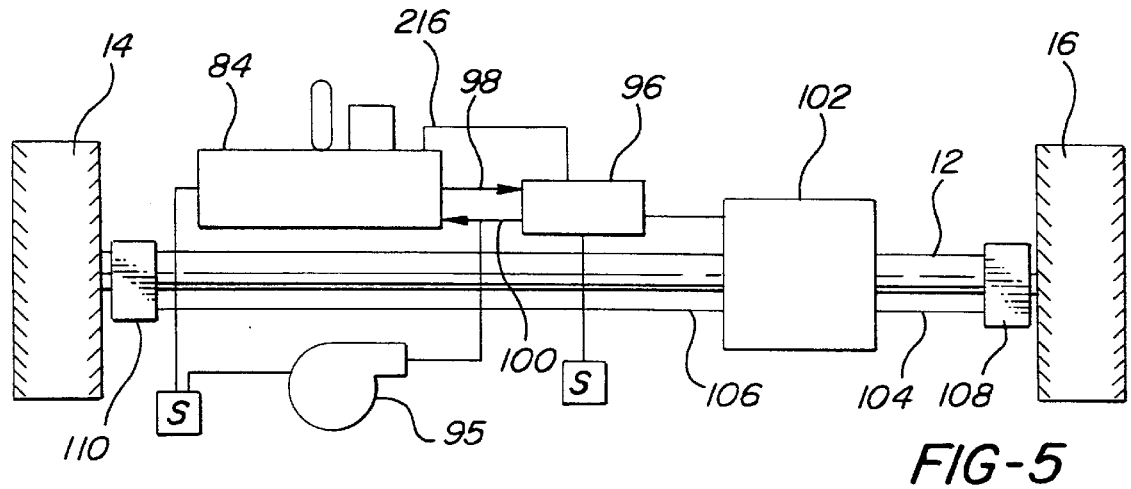
FIG. 5 is a schematic view of the traction drive.
Figure 7:
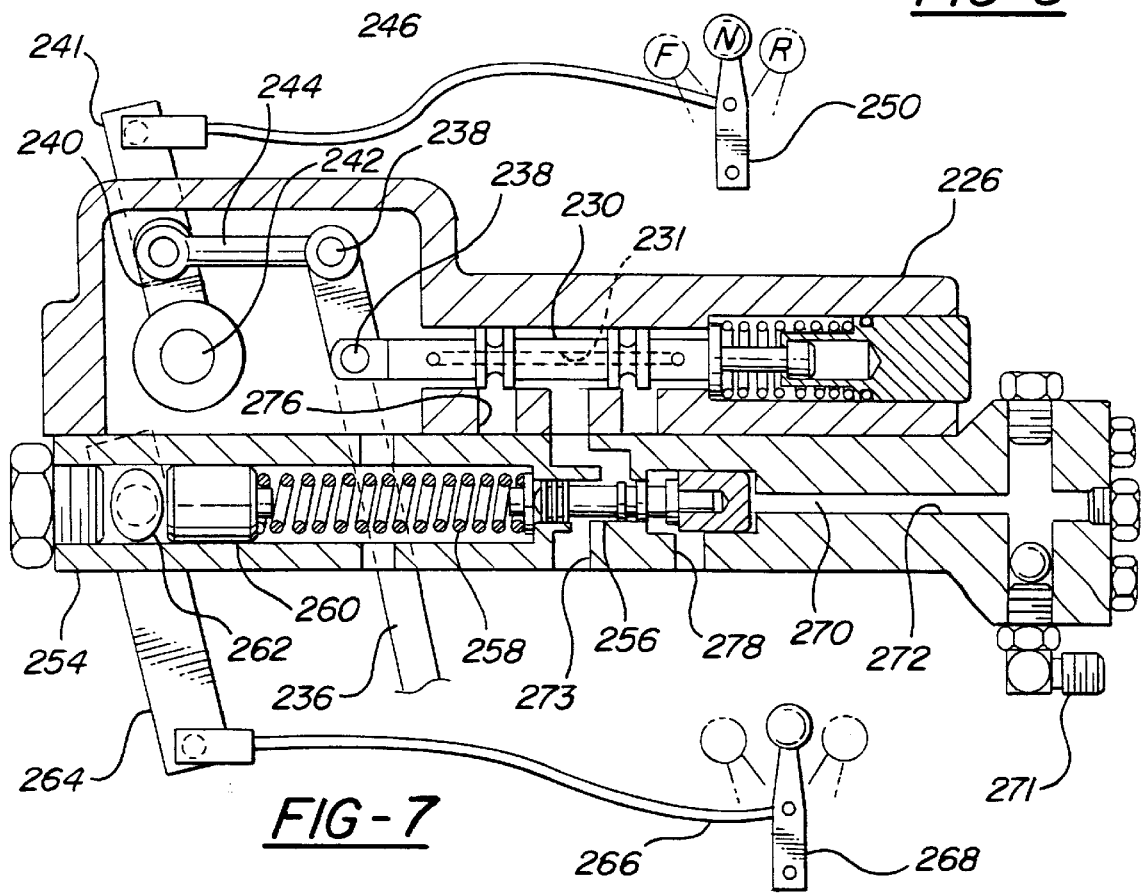
FIG. 7 is an enlarged view of the pressure override control valve in a combination with the traction drive manual control valve.
Figure 6:
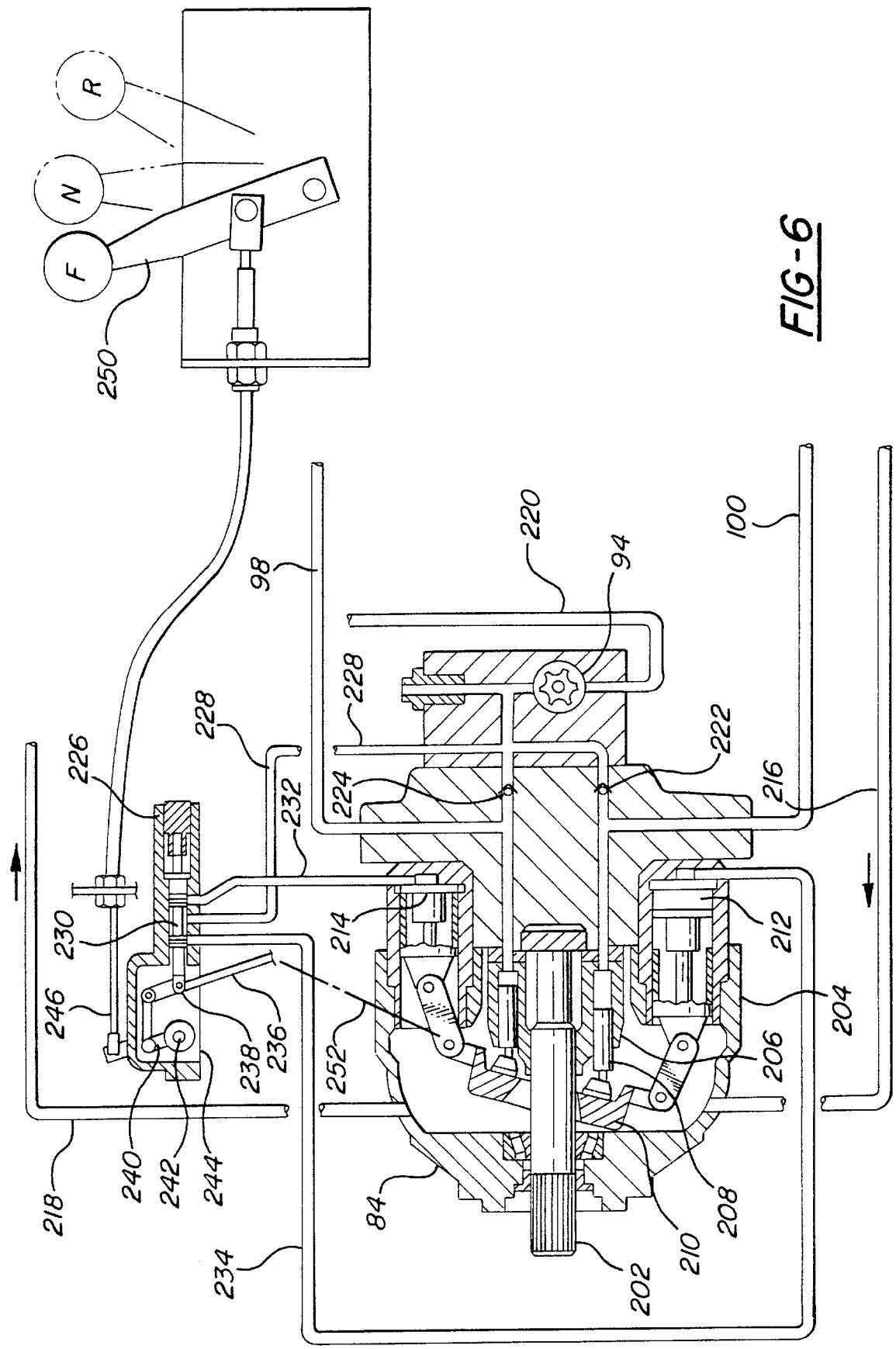
FIG. 6 is a schematic view of the traction drive pump.

The crop material feed rate control described above is an electronic control system. A mechanical and hydraulic control system can also be employed. The crop material feed rate system shown in FIGS. 6 and 7 is a mechanical and hydraulic control system. The pumps 82 and 84 and the motors 86 and 96, shown in FIGS. 4 and 5 are the same in the mechanical and hydraulic control system as they are in the electronic control system described above.

The pumps 82 and 84 are preferably axial piston pumps with swash plates as shown in FIG. 6. The swash plates are adjustable, as described below, to adjust the output speed of the motors 86 and 96 driven by the pumps 82 and 84. The motors 86 and 96 are also preferably axial piston motors with swash plates. The swash plates for the motors 86 and 96 can be either fixed or adjustable. If the swash plates are adjustable, the adjustment can be one that shifts the swash plates between a high speed range and a low speed range. The adjustment of swash plates in the motors 86 and 96 can also be coordinated with adjustment of the swash plates in the pumps 82 and 84 to obtain improved efficiency of each pump and motor combination. Although the pumps and motors are preferably axial piston units with swash plates, as set forth above, other types of motors could be used. It would also be possible to use other types of pumps.

The traction drive pump 84 has had an input shaft 202 journaled in a pump casing 204 and driven by the internal combustion engine 38. As rotor 206 on the shaft 202 rotates with the shaft and carries a plurality of axial pistons 208, the pistons 208 contact a swash plate 210. The swash plate 210 forces the pistons 208 into their bores in the rotor 206 and forces hydraulic fluid out. The swash plate 210 is pivotally mounted in the casing 204 for pivotal movement about a transverse horizontal axis that passes through the input shaft 202. Servo pistons 212 and 214 pivot the swash plate 210 to control the stroke of the pistons 208 and the direction of fluid flow.

Leakage of hydraulic fluid in the traction drive motor 96 is returned to the casing 204 of the pump 84 through a line 216. Hydraulic fluid leakage in the casing 204 is drained through a discharge line 218 that delivers the hydraulic fluid to a sump S. A fluid make-up pump 94 draws hydraulic fluid from the sump S through a suction line 220 and delivers the fluid to the return line 100 or the supply line 98 through check valve 222 or check valve 224 shown in FIG. 6. The fluid make-up pump 94 supplies hydraulic fluid at 350 psi. The check valve 222 opens and lets fluid from the make-up pump 94 enter the piston bores in the rotor 206 when the pressure in the return line 100 is less than 350 psi. The pressure of fluid in the return line 100 forces the piston 208 toward the swash plate 210 and fills the piston bores. The check valve 224 remains closed when the pressure of fluid in supply line 98 is above 350 psi. Pivotal movement of the swash plate 210, from the position in which the servo piston 212 is retracted and the servo piston 214 is extended, will change the supply line 98 to a return line and will change the return line 100 to a supply line. These changes reverse the flow of fluid to the motor 96 and reverse the motor output shaft. The fluid make-up pump 94 also supplies fluid to the control valve 226 through a control fluid line 228.

The control valve 226, which is mounted on the pump casing 204, is a spool valve with a spool 230. When the spool 230 is centered, the swash plate 210 remains in a substantially fixed position and no hydraulic fluid is passed from the valve 226. When the spool 230 moves to the right as shown in FIG. 6, hydraulic fluid, from the pump 94 and line 228, passes to the servo piston 214 through the line 232 and fluid is free to move from the servo piston 212 through to line 234 and to the sump S. When the spool 230 moves to the left as shown in FIG. 6, hydraulic fluid, from the pump 94 and line 228, passes to the servo piston 212 through the line 234 and fluid is free to move from the servo piston 214 through the line 232 to the sump S. Hydraulic fluid which enters the valve 226 through the line 232 passes through a passage 231 (shown in FIG. 7) in a spool 230 to reach the sump. The spool 230, as shown in FIG. 6, is pivotally connected to the center of a bell crank 236 by a pivot pin 238. The upper end of the bell crank 236 is connected to an arm 240 on a manually controlled shaft 242 by connecting rod 244. The shaft 242 is manually pivoted by a boden wire 246 with one end attached to an arm 241 on the shaft 242. The other end of the boden wire 246 is connected to a manual control lever 250. The control lever 250 has a full speed forward position F, a neutral position N, and a full speed reverse position R as shown in FIG. 6. The lower end of the bell crank 236 is attached to the swash plate 210 by the followup linkage indicated by the phantom line 252. When the lever 250 is moved, the spool 230 supplies hydraulic fluid to one of the servo pistons 212 or 214 until the swash plate 210 moves to its new position corresponding to the position of the lever 250. The spool 230 is returned to a position, in which the flow of hydraulic fluid to both servo pistons 212 and 214 is blocked, by the followup linkage 252 and the bell crank 236 as a swash plate 210 moves to a position that corresponds to a position of the lever 250. A manually set position of the lever 250 controls the direction of rotation of the traction drive motor 96 as well as the speed of rotation.

A crop material feed rate control valve 254 is positioned between the control valve 226 and the pump casing 204 when the harvester 10 is equipped with a mechanical and hydraulic control system. The crop material feed rate control valve 254 has a spool 256 that is biased to the right as shown in FIG. 7 by a compression spring 258. The compression spring is tensioned by a piston 260 that contacts a rotatable cam 262. The cam 262 is manually rotated by a lever arm 264, and linkage 266 and a rotor load control adjustment lever 268 located near the operator's work station. The other end of the spool 256 is biased to the left by a piston 270 in a bore 272. The bore 272 is connected to hydraulic fluid at the pressure of hydraulic fluid in the supply line 90 at the inlet port of the rotor motor 86 by pipe fitting 271 and a line.

The pump 94 and the control fluid line 228 supply hydraulic fluid to the port 273 in the feed rate control valve 254. When the spring 258 is biasing the spool 256 to the right as shown in FIG. 7, fluid entering port 273 is supplied to the spool 230. A spool 230 will hold the pressure of hydraulic fluid supplied to one of the servo pistons 212 or 214 to maintain harvester ground speed and crop material feed rate if the force exerted by the spring 258 is equal to or greater than the force exerted by the piston 270.

When the force exerted on the spool 256 by the piston 270, due to the pressure of hydraulic fluid in the bore 272 connected to the supply line 90 for the rotor motor 86, exceeds the force exerted by the spring 258, the spool 256 moves to the left as shown in FIG. 7 and passage 273 is connected to the port 278 and the casing 204. Leakage from the port 276 past the spool 230 allows hydraulic fluid to flow out of the servo piston 212 thereby destroking the pump 84. Destroking the pump 84 decreases forward speed of the harvester 10. The decrease in forward speed generally decreases crop material feed rate. The lever 250 controls maximum forward speed and will override the system when the selected feed rate can not be obtained at the maximum forward speed selected by the operator.

An increase in the crop material feed rate will increase the pressure of hydraulic fluid entering the rotor motor 86. The increase in pressure entering the rotor motor 86 increases the pressure of hydraulic fluid in the bore 272. Excess pressure in the bore 272 causes the piston 270 to move the spool 256 to the left and compress the spring 258. The spool 256 then closes the port 273 and opens the port 278, which is connected to the inside of the casing 204 and the sump S by the line 218. Reducing the pressure of hydraulic fluid supplied to the spool 230 allows hydraulic fluid to pass from the port 276 and the servo piston 212 to the port 278 and to the sump S. The ground speed will decrease until the force exerted on the spool 256 by hydraulic fluid and the piston 270 equals the force exerted by the spring 258. When these forces are balanced, the spool 256 will move to the right thereby opening the port 273 and closing the port 278. The pressure of hydraulic fluid supplied to the spool 230, through the port 273, will maintain pressure in the port 276 and hold the swash plate 210 in place, thereby maintaining harvester ground speed and crop material feed rate.

The lever 268 located in the cab 24 is used by the operator to set the maximum crop material feed rate through the rotor 56 by limiting the pressure to the motor 86. The lever 250, located in the cab 24 is used by the operator to set the maximum forward speed of the harvester 10. The operator can stop forward movement of the harvester 10 with the lever 250 and can also move the machine in reverse. The operator cannot however, increase forward speed and crop material feed rate above the crop material feed rate setting of the lever 268. The lever 268 can prevent the threshing rotor 56 from being overloaded. The lever 250 can prevent the grounds speed of the harvester 10 from exceeding the maximum speed desired by the operator.

Applicant's co-pending U.S. Patent Application, the disclosure of which is incorporated herein by reference, is directed to a threshing rotor speed control system. This rotor speed control system can be used together with the crop material feed rate controls described above. The disclosed embodiments are representative of presently preferred forms of the invention, but are intended to be illustrative rather than definitive thereof. The invention is defined in the claims.

I claim:

1. A combine harvester comprising a frame; a crop gathering mechanism mounted on a forward portion of the frame, a threshing cylinder and concave assembly mounted on the frame that receives crop material from the crop gathering mechanism and threshes the crop material; a cylinder drive hydraulic motor that rotates the threshing cylinder; a variable speed traction drive that propels the harvester across a field; and a controller, connected to the variable speed traction drive and to the cylinder drive hydraulic motor, that measures the pressure of hydraulic fluid driving the cylinder drive hydraulic motor, compares the measured pressure with a selected pressure set point and changes the variable speed traction drive to control a feed rate of crop material passing into the threshing cylinder and concave assembly.

2. A combine harvester as set forth in claim 1 wherein controlling the feed rate of crop material also controls the pressure of hydraulic fluid driving the cylinder drive hydraulic motor.

3. A combine harvester as set forth in claim 1 wherein the combine harvester includes an engine, and a cylinder drive hydraulic pump driven by the engine and connected to the cylinder drive hydraulic motor by a supply pipe that supplies hydraulic fluid under pressure to the cylinder drive hydraulic motor.

4. A combine harvester as set forth in claim 3 wherein the cylinder drive hydraulic pump is also connected to the cylinder drive hydraulic motor by a return line.

5. A combine harvester as set forth in claim 4 wherein the supply line and the return line connect the cylinder drive hydraulic pump to the cylinder drive hydraulic motor in a closed loop hydraulic circuit.

6. A combine harvester as set forth in claim 1 wherein the variable speed traction drive includes a traction drive hydraulic motor that provides torque to propel the harvester across a field and the speed of the traction drive hydraulic motor is varied to change the feed rate of crop material.

7. A combine harvester as set forth in claim 6 wherein the variable speed traction drive includes a traction drive pump driven by an engine mounted on the frame.

8. A combine harvester as set forth in claim 7 wherein the traction drive pump is connected to the traction drive motor by a traction drive supply line and a traction drive return line in a closed loop hydraulic system.

9. A combine harvester as set forth in claim 5 wherein the variable speed traction drive includes a traction drive motor and a traction drive pump connected to each other by a traction drive supply line and a traction drive return line that forms a closed loop traction drive hydraulic system.

10. A combine harvester as set forth in claim 8 wherein the traction drive pump has an adjustable swash plate and the adjustable swash plate is moved to change the speed of the traction drive motor.

11. A combine harvester as set forth in claim 8 wherein the traction drive motor has an adjustable swash plate.

12. A self-propelled combine harvester comprising a frame; a plurality of wheels supporting the frame; at least two driven wheels mounted on the frame for propelling the frame; a crop gathering mechanism mounted on the forward portion of the frame for conveying crop material to a separator housing; a threshing and separating rotor rotatably journaled on the frame inside the separator housing; a concave mounted on the frame that cooperates with the threshing and separating rotor to thresh grain; a separation grate mounted on the frame that cooperates with the threshing and separating rotor to separate grain from threshed crop material; a cleaning assembly mounted on the frame inside the separator housing; an internal combustion engine mounted on the frame for driving the harvester; a rotor hydraulic motor driving the threshing and separating rotor; a rotor hydraulic pump driven by the internal combustion engine and connected to the rotor hydraulic motor to supply hydraulic fluid under pressure to the rotor hydraulic motor; a traction drive hydraulic motor driving the driven wheels; a traction drive hydraulic pump driven by the internal combustion engine and connected to the traction drive hydraulic motor to supply hydraulic fluid under pressure to the traction drive hydraulic motor; a pressure transducer for measuring the pressure of hydraulic fluid entering the rotor hydraulic motor; a swash plate adjuster that changes the speed of the traction drive hydraulic motor; an electronic controller connected to the pressure transducer and to the swash plate adjuster that compares the pressure signal from the pressure signal transducer with an adjustable set point pressure and sends signals to the swash plate adjuster as required to adjust the traction drive speed to maintain a substantially constant crop material feed rate through the threshing and separating rotor.

13. A self-propelled combine harvester as set forth in claim 12 wherein the rotor hydraulic motor is connected to the rotor hydraulic pump in a closed circuit hydraulic system.

14. A self-propelled combine harvester as set forth in claim 12 wherein the traction drive hydraulic motor is connected to the traction drive hydraulic pump in a closed circuit hydraulic system.

15. A self-propelled combine harvester as set forth in claim 13 wherein the traction drive hydraulic motor is connected to the traction drive hydraulic pump in a closed circuit hydraulic system.

16. A self-propelled combine harvester comprising a frame; a plurality of wheels supporting the frame; at least two driven wheels mounted on the frame for propelling the frame; a crop gathering mechanism mounted on the forward portion of the frame for conveying crop material to a separator housing; a threshing cylinder rotatably journaled on the frame; a concave mounted on the frame that cooperates with the threshing cylinder to thresh grain; an internal combustion engine mounted on the frame for driving the harvester; a threshing cylinder hydraulic motor driving the threshing cylinder; a source of hydraulic fluid connected to the threshing cylinder hydraulic motor; a traction drive hydraulic motor driving the driven wheels; a traction drive hydraulic pump driven by the internal combustion engine and connected to the traction drive hydraulic motor to supply hydraulic fluid under pressure to the traction drive hydraulic motor, a traction pump swash plate adjustably mounted in the traction drive hydraulic pump for controlling hydraulic fluid flow to the traction drive hydraulic motor; a traction pump swash plate control valve connected to the traction drive hydraulic pump that controls the position of the traction pump swash plate; and a feed rate control valve connected to a hydraulic fluid inlet of the threshing cylinder hydraulic motor, a source of hydraulic fluid under pressure and in hydraulic communication with a control fluid inlet in the traction pump swash plate control valve and wherein the feed rate control valve controls the flow of hydraulic fluid through the control fluid inlet to control crop material feed rate through the threshing cylinder and the concave.

17. A self-propelled combine harvester as set forth in claim 16 wherein the feed rate control valve has an adjustable threshing cylinder load selector.

18. A self-propelled combine harvester as set forth in claim 16 wherein the traction pump swash plate control valve has an adjustable maximum traction motor speed control.

19. A self-propelled combine harvester as set forth in claim 18 wherein the feed rate control valve has an adjustable threshing cylinder load selector.

20. A self-propelled combine harvester as set forth in claim 16 wherein the source of hydraulic fluid connected to the threshing cylinder hydraulic motor is a threshing cylinder hydraulic pump driven by the internal combustion engine.

21. A combine harvester crop material feed rate control method for controlling the rate at which crop material is fed to a threshing cylinder and a threshing concave of the harvester comprising:

(a) selecting a set point pressure corresponding to a torque load on the threshing cylinder;

(b) measuring the pressure of hydraulic fluid entering an inlet port of a threshing cylinder drive hydraulic motor;

(c) comparing the measured pressure of hydraulic fluid entering the inlet port of the cylinder drive hydraulic motor with the selected set point pressure;

(d) increasing ground speed of the harvester when the measured pressure of the hydraulic fluid entering the inlet port of the threshing cylinder drive hydraulic motor is less than the selected set point pressure by more than a predetermined amount;

(e) decreasing the ground speed of the harvester when the measured pressure of hydraulic fluid entering the inlet port of the threshing cylinder drive hydraulic motor is more than the selected set point pressure by more than a predetermined amount; and (f) adjusting the set point pressure when the feed rate is to be changed.

22. A combine harvester crop material feed rate control as set forth in claim 21 including: selecting a maximum ground speed of the harvester which is not exceeded when the measured pressure of the hydraulic fluid entering the inlet port of the threshing cylinder drive motor is less than the selected set point pressure.

* * * * *